Feb. 28, 1967  J. R. HARKNESS ETAL  3,306,276
MEANS FOR REDUCING STARTING TORQUE IN FOUR-CYCLE ENGINES
Filed March 25, 1965  4 Sheets-Sheet 2
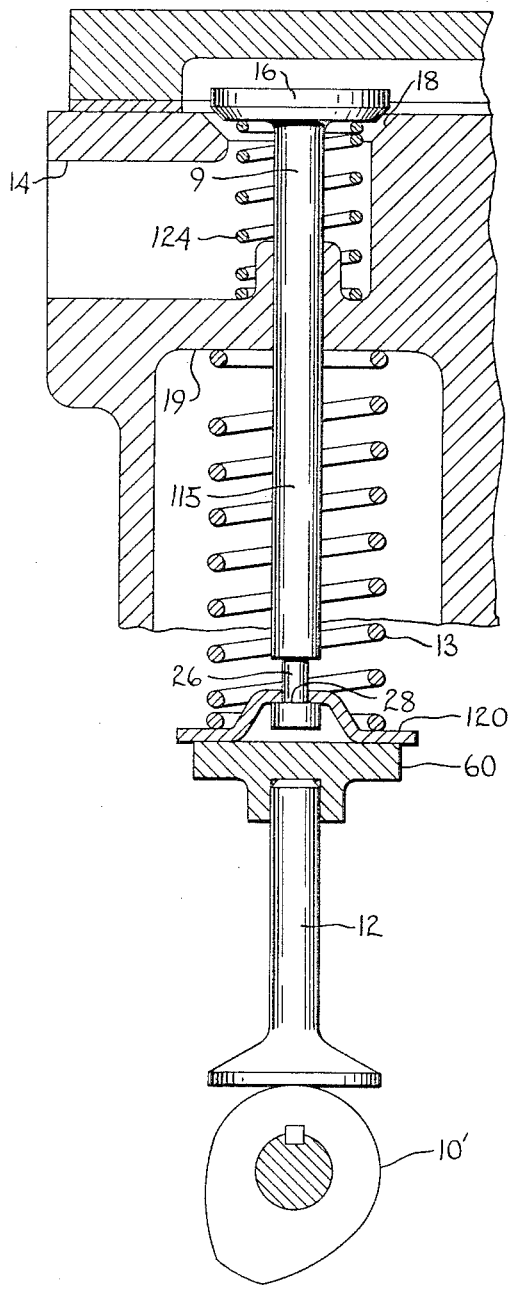
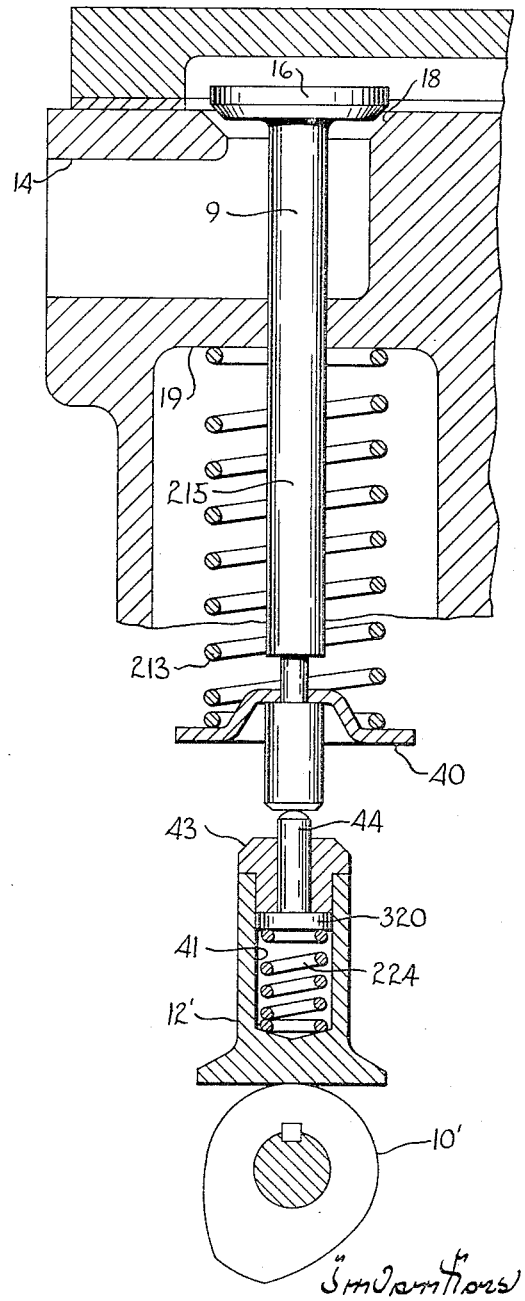
Joseph Robert Harkness
Richard W. Seilenbinder
John D. Sanzi

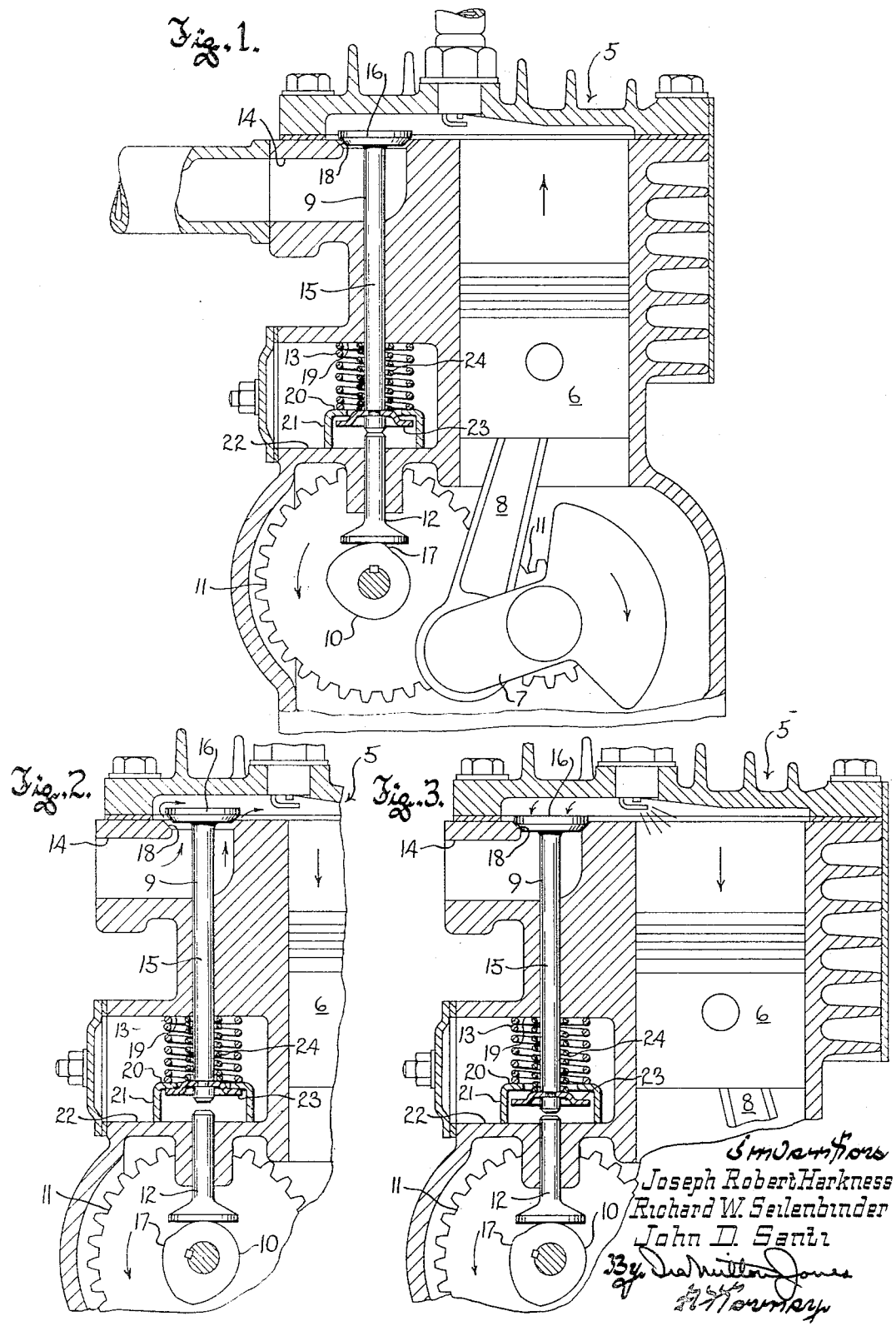

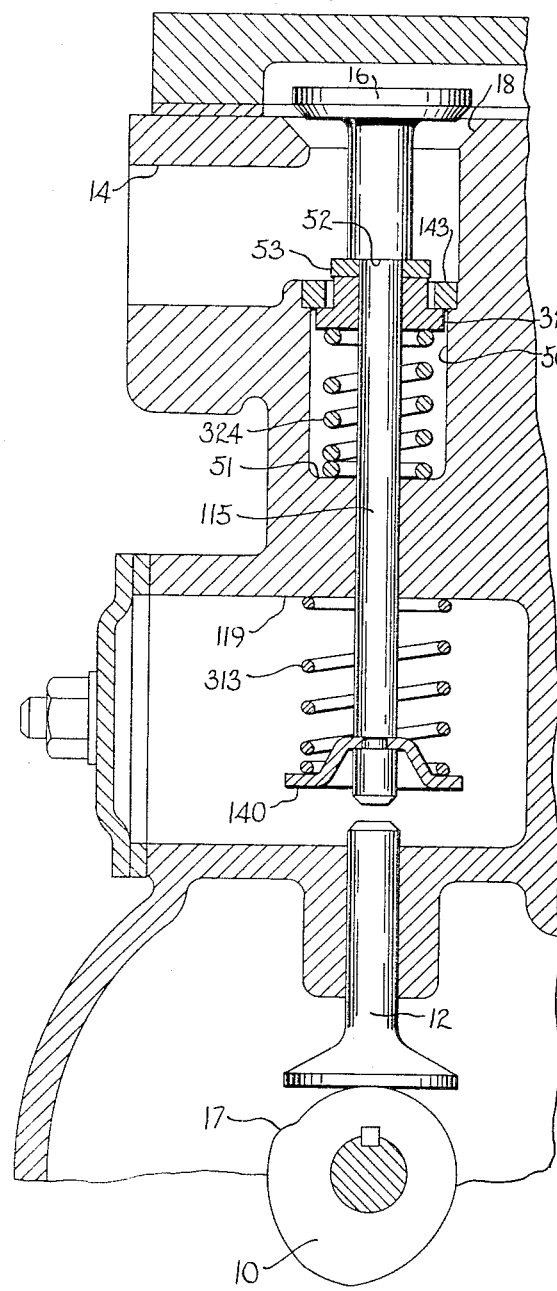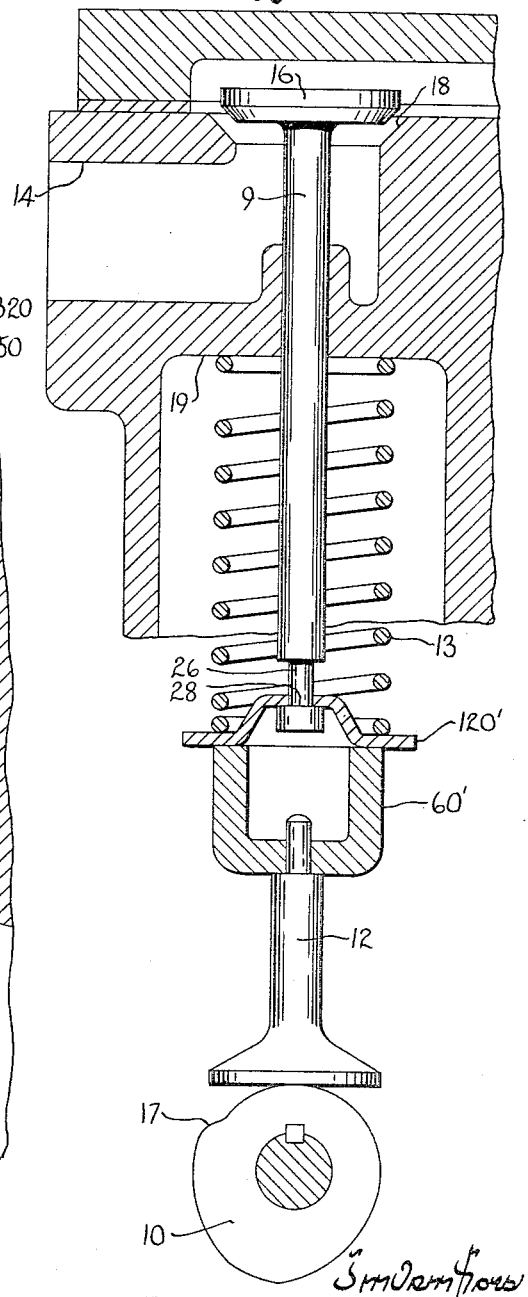

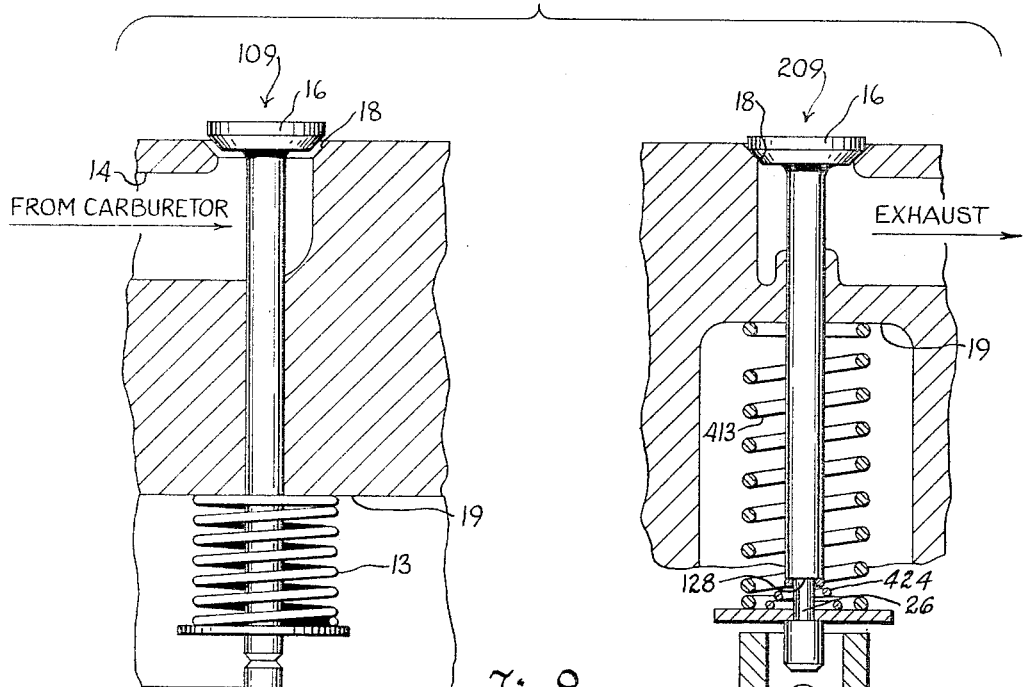
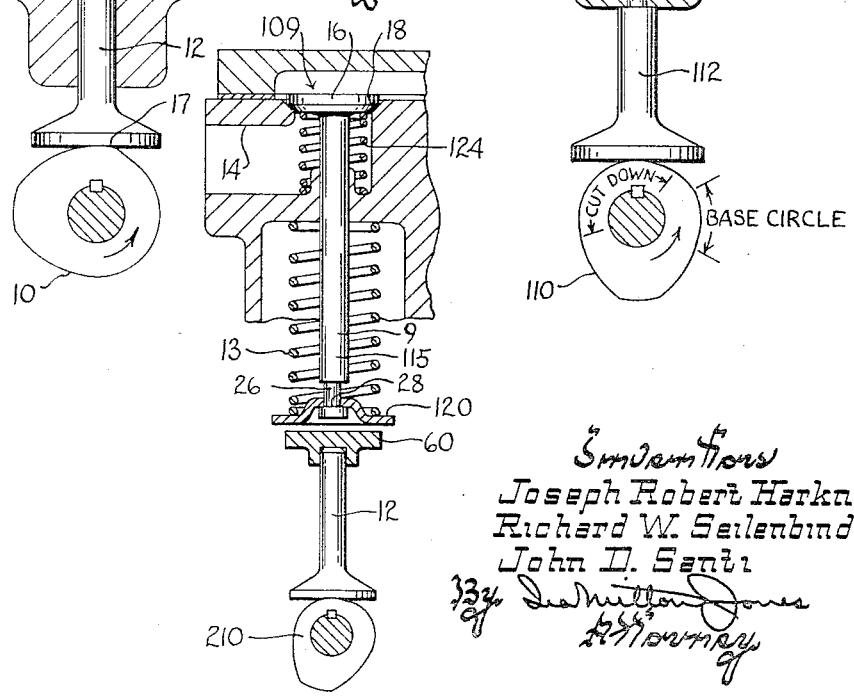

United States Patent Office 3,306,276
Patented Feb. 28, 1967

3,306,276
MEANS FOR REDUCING STARTING TORQUE IN FOUR-CYCLE ENGINES
Joseph R. Harkness, Germantown, Richard W. Sellenbinder, Milwaukee, and John D. Santi, West Allis, Wis., assignors to Briggs & Stratton Corporation, Milwaukee, Wis., a corporation of Delaware
Filed Mar. 25, 1965, Ser. No. 442,621
14 Claims. (Cl. 123—182)

This invention relates to internal combustion engines, and more particularly to four-stroke cycle engines; and the general purpose of the invention is to make the starting of such engines easier by reducing the torque required to turn the crankshaft of the engine during starting.

Patent No. 2,999,491, issued September 12, 1961 to J. R. Harkness, disclosed a method and means for facilitating the starting of a four-stroke cycle engine by providing for the reduction of compression in the cylinder whenever the engine was being turned over at slow speed, as during starting, and accomplished this with only a very slight sacrifice of compression at times when the engine was operating at normal running speeds. Briefly, the expedient disclosed in that patent was a very slight modification of one of the valve cams (preferably the cam that controlled actuation of the intake valve) whereby the cam held the valve off of its seat by about .010 in. during movement of the piston through a substantial portion of its compression stroke, the valve being thus open while the piston moved from a point about one-eighth of its total ascent from bottom dead center to a point at about five-eighths of its total ascent, with gradual closure of the valve occurring after the piston had passed the last mentioned point, until the valve was fully closed when the piston reached about three-quarters of its total ascent. With this arrangement the slightly open valve provided a precisely controlled orifice through which part of the charge being compressed escaped from the cylinder, to thus significantly reduce compression during starting, when the piston traveled slowly. At running speeds, however, the orifice provided by the partly open valve was insignificant and did not detrimentally affect engine performance.

The invention of the above mentioned patent was highly satisfactory, and in fact met with enthusiastic commercial acceptance because it greatly reduced the exertion required for starting small four-cycle engines, such as are commonly used for powering lawn mowers, tillers, small snow blowers, garden tractors and the like, when such engines were equipped with the conventional and inexpensive rope starter.

However, further research on the starting of small four-cycle engines has disclosed the possibility of an even greater reduction of starting torque than was provided by the invention of the aforesaid Harkness patent. Specifically, it has been discovered that the torque required to turn over an engine equipped with the invention of the Harkness patent is greatest during the power stroke when combustion is not taking place. This is because the piston is then moving downwardly against a pressure difference due to increasing suction, which suction results from the partial discharge of gas from the cylinder during the immediately preceding compression stroke; and it was found that a substantial force is required to drive the piston downwardly against that pressure difference.

With this discovery in mind, it is a general object of the present invention to provide means in a four-stroke cycle engine for greatly facilitating the starting thereof by relieving compression through a substantial part of the compression stroke and by relieving suction during a subsequent power stroke in which combustion does not take place, and wherein said means for relieving suction is automatically rendered inoperative by the occurrence in the cylinder of combustion and its resulting pressure.

Another and more specific object of this invention is to provide simple means associated with one of the valves of a four-cycle engine for positively moving the valve between its open and its closed positions whenever the valve is more than a predetermined small distance from its closed position, and for rendering the valve substantially free to move in response to gas pressure forces across its head whenever, during a selected portion or portions of the engine cycle, the valve is within said distance of its seated position, so that during such portion or portions of the cycle the valve can automatically assume either a slightly open position or a fully closed position depending upon pressure conditions within the cylinder.

More specifically it is an object of this invention to provide, in a four-stroke cycle engine having intake and exhaust valves, and actuating means for each valve comprising a cam and a spring by which the instantaneous position of the valve is normally established in timed relation to reciprocation of the piston, means for rendering the actuating means for one of the valves substantially ineffective to establish the position of the same whenever, during a selected portion or portions of the engine cycle, said valve is within a small predetermined distance from its heat, so that the valve is then responsive to differences between pressure in its manifold and pressure in the cylinder.

From what has just been said it will be apparent that it is an object of the present invention, in one of its aspects, to provide means in an engine equipped with the cam of Patent No. 2,999,491 for automatically relieving suction in the cylinder during a power stroke in which combustion does not occur, without loss of gas pressure during full throttle operation of the engine, to thus substantially reduce starting torque during both the compression and power strokes of the engine.

The invention of the aforesaid Harkness patent was primarily useful on small single-cylinder engines, since larger engines are usually provided with power driven starters. Furthermore the very slight loss of full throttle power (on the order of 3%) resulting from the expedient of that invention was of no practical consequence in a small engine and was in any event a small price to pay for the easier starting that it produced; but on a substantially larger engine such power loss might be critical during full throttle operation, or at least might not offset the starting benefits for which it had been sacrificed. By contrast, it is an object of the present invention in certain of its embodiments to so materially reduce the starting torque of a four-stroke cycle engine that an appreciably lighter, more compact and less powerful starting motor can be used when the invention is applied to a multi-cylinder engine of substantial size, and, moreover, to achieve such reduction in starting torque without any sacrifice in full throttle power output of the engine or any significant increase in engine weight or complexity, and with the employment of entirely conventional valve cams.

In connection with the last-mentioned embodiments of the invention it is another and more specific object of this invention to provide simple means in a four-cycle engine, cooperating with one of the valves and comprising a pair of valve springs of unequal force and means for restraining one of said springs from imposing biasing force upon the valve when the valve is spaced a small distance from its closed position, for subjecting said valve to two ranges of biasing force, in one of which ranges the valve is strongly biased toward its closed position whenever it is more than a predetermined small distance from its seat, and in the other of which ranges the valve is lightly biased away from its closed position whenever it is within said small distance from its seat, to thus enable the valve, during the compression and power strokes, to automatically assume either its fully closed position, if there is substantial pressure in the cylinder, or a slightly open position, if there is slight pressure or suction in the cylinder.

A further object of the present invention, achieved in other of its embodiments, is to retain a coincidental but important advantage flowing from the expedient of the above mentioned Harkness patent and residing in the substantial minimization of the effects of "kickback" which occurs if combustion takes place in the cylinder of an engine at a time when the crankshaft and flywheel have very little momentum. Since the ignition system of a four-cycle engine normally effects firing of the spark plug during the latter part of the compression stroke, the crankshaft must be turning at a fairly fast speed in order for it and the flywheel to have enough inertia to carry the piston through top dead center and into the combustion stroke during the early stages of combustion. If crankshaft speed is too low, the combusting mixture forces the piston back down before it reaches the top of its compression stroke, causing the crankshaft to turn in its reverse direction and produce the familiar "kickback." With the came arrangement of Patent No. 2,999,491, the amount of charge taken into the cylinder during an intake stroke was reduced during the subsequent compression stroke as gases were permitted to escape from the cylinder through the slightly open intake valve, thus reducing the amount of energy available for a kickback; and as the crankshaft backed up in a kickback stroke the intake valve was again lifted slightly off its seat, substantially relieving combustion gas pressure in the cylinder. Because of these two factors, so much of the force was taken out of kickbacks in an engine having the cam arrangement of Patent No. 2,999,491 that an operator might not even notice them. It is thus an object of the present invention to obtain this same substantial elimination of the effects of kickbacks, concomitantly with the achievement of the other objects of the invention herein set forth.

A further object of this invention is to provide means for reducing starting torque in a four-stroke cycle engine without incurring any substantial sacrifice of engine performance and efficiency, which means fully comports with essential requirements dictated by practical experience, such as: fully automatic operation, extreme simplicity and low cost, freedom from the need for maintenance, complete reliability, and ready adaptability to existing engine designs without the need for substantial modification.

With the above and other objects in view which will appear as the description proceeds, this invention resides in the novel construction, combination and arrangement of parts substantially as hereinafter described and more particularly defined by the appended claims, it being understood that such changes in the precise embodiments of the hereindisclosed invention may be made as come within the scope of the claims.

The accompanying drawings illustrate several complete embodiments of the invention, constructed according to the best modes so far devised for the practical application of the principles thereof, and in which FIGURE 1 is a fragmentary vertical sectional view of a single cylinder four-stroke cycle engine incorporating an embodiment of the present invention, the engine being shown with the piston moving in its compression stroke;

FIGURE 2 is a fragmentary view similar to FIGURE 1 but showing the conditions that obtain during starting with the piston moving in its power or combustion stroke and no combustion occurring;

FIGURE 3 is a view similar to FIGURE 2 but showing the conditions that exist with the piston moving in its power stroke during normal running of the engine;

FIGURES 4-7 are views generally similar to FIGURE 2 but showing several modified embodiments of the invention;

FIGURE 8 is a composite vertical sectional view showing another embodiment of the invention in relation to the intake and exhaust valves of an engine; and FIGURE 9 is a view generally similar to FIGURE 2 but showing another modified embodiment of the invention intended only for effecting compression relief during starting.

Referring now to the accompanying drawings, and more particularly to FIGURES 1-3, the numeral 5 designates generally the cylinder of a four-stroke cycle engine in which a piston 6 is reciprocable to drive a crankshaft 7 through a connecting rod 8. The engine is provided, as is conventional, with inlet and exhaust valves which control the admittance of fuel-air mixture to the cylinder from an intake manifold and the discharge of combustion gases from the cylinder into an exhaust manifold. In this instance only one of the valves, designated by 9, is shown, and it is illustrated as the inlet valve, although the invention could as well be applied to the exhaust valve, as explained hereinafter.

As is conventional, the valve 9 is actuated by a cam 10 which is rotated at one-half crankshaft speed by means of timing gears 11 that drivingly connect the cam and the crankshaft. As the piston moves downwardly in its intake stroke, the cam 10, acting through a tappet 12 and against the bias of a spring 13, holds the valve 9 in a fully open position, so that combustible mixture can be drawn into the cylinder from a manifold 14, all as is conventional. The valve 9 is shown as being conventional in having an elongated stem 15 at the top of which there is an enlarged coaxial head 16 that constitutes the valve element proper. The spring 13 is likewise shown as conventional in that it is a helical compression spring which substantially coaxially surrounds the stem; and this is also true of all other springs mentioned hereinafter.

In the embodiment of the invention illustrated in FIGURES 1, 2 and 3, the cam 10 is formed in accordance with the principles disclosed in Patent No. 2,999,491, and thus has a small lobe or bulge 17 which holds the valve a predetermined small distance away from its seat 18 during a substantial portion of the compression stroke. Hence, as explained in said patent, when the piston moves up relatively slowly, as it does during starting, it can displace out of the cylinder a portion of the mixture drawn in during the preceding intake stroke, so that the piston need not be moved against the force required for compression of the full charge; but when the piston moves up rapidly in its compression stroke, as it does during normal running operation, only a negligibly small portion of the mixture charge is displaced out of the cylinder, due to the very small area of the outlet orifice defined by the partially open valve. Thus, to prevent excessive compression loss during running operation, the lobe or bulge 17 on the cam 10 holds the inlet valve 9 at a distance from its seat 18 of only about .010 in.

It is a feature of the present invention that as the piston moves downwardly in its power or combustion stroke, the position of the valve 9 depends upon whether or not combustion is taking place in the cylinder, because the valve 9 is responsive to the difference between manifold pressure and pressure in the cylinder whenever the cam is imposing no lift upon the valve and the valve is within a predetermined small distance from its seat; and hence the valve automatically opens slightly to relieve suction in the cylinder during a non-firing power stroke and automatically closes to prevent loss of pressure gas from the cylinder when combustion takes place during the power stroke. Such fully automatic pressure responsive operation of the valve 9 is provided for by reason of the fact that the valve spring 13 is prevented from imposing its biasing force upon the valve whenever the latter is within the above mentioned small distance from its closed position, so that the valve can move through that distance quite readily in response to gas pressure forces upon its head 16.

The spring 13 has one end bearing against a fixed spring seat 19 that can be provided by a part of the engine cylinder body casting, and it has its other end engaged with an annular force transmitting member 20 that loosely surrounds the valve stem 15. The force transmitting member is substantially cup-shaped, having a circumferential flange 21 which projects downwardly, away from the spring 13, and which is engageable with an upwardly facing abutment surface 22 on the cylinder body that defines the limit of motion of the force transmitting member away from the spring seat 19. The force which the spring 13 imposes upon the force transmitting member can be transferred to the valve through a washer 23 that is anchored to the stem of the valve, beneath the force transmitting member, and which provides a unidirectional driving connection between the force transmitting member and the valve.

The relationship between the parts just described is such that when the cam 10 forces the valve 9 more than the above mentioned predetermined small distance off of its seat, the spring 13, acting through the force transmitting member 20 and the washer 23, strongly biases the valve toward its closed position, thereby maintaining the valve stem engaged with the tappet 12, and the tappet with the cam, and insuring prompt movement of the valve away from its fully open position at the proper time near the conclusion of the intake stroke. In other words, the position of the valve when it is more than said predetermined distance from its seat is positively established, in a substantially conventional manner, by the valve actuating mechanism comprising the cam 10 and the spring 13.

But as the cam moves toward its power stroke position and permits the valve to come to said predetermined small distance from its seat, the force transmitting member bottoms on the abutment surface 22, so that spring 13 no longer maintains the valve in following relation to the cam 10. Hence when the cam is in its power stroke position the valve is free to move through that small distance, toward and from its seat, in response to gas pressure forces upon its head. In this respect it is noteworthy that the portion of the cam 10 which controls the position of the valve during the power stroke is entirely conventional, that is, the cam permits the valve to be engaged with its seat all during the power stroke and provides for the usual tappet clearance when the valve is closed.

During the exhaust stroke the valve is likewise free to move through said small distance independently of its actuating means comprising the cam 10 and spring 13, but normally of course it remains seated during the exhaust stroke because pressure in the cylinder is higher than that in the intake manifold.

As shown, a small spring 24 at all times reacts between the spring seat 19 and the washer 23 to lightly bias the valve 9 toward its closed position, so that the valve does not open during an unfired combustion stroke until suction in the cylinder exceeds a certain value, and so that the valve is positively seated during ignited combustion strokes; but it will be apparent that there will be situations in which the light spring 24 will be unnecessary inasmuch as gravity and inertia forces will not interfere with response of the valve to pressure forces on its head.

The size of the small distance through which the valve can "float" toward and from its seat during the power stroke is determined by various design considerations but is typically on the order of .010 to .020 in.

The modified embodiment of the invention illustrated in FIGURE 4 utilizes a cam 10' which is completely conventional—i.e., a cam which does not have the feature of Patent No. 2,999,491; but the structure shown in FIGURE 4 nevertheless provides for both compression relief and suction relief during starting, and has the advantage, moreover, of entailing no sacrifice of gas pressures in the cylinder when the engine is running at full power output. In this instance the spring 13 which biases the valve 9 away from its open position and into following relation with the cam 10' reacts between a fixed downwardly facing spring seat 19 on the cylinder body and an annular force transmitting member 120 which is downwardly dished and which is movable toward and from said spring seat. However, the limit of motion of the force transmitting member away from the spring seat 19 is defined by the cam 10', inasmuch as the spring 13 at all times maintains the force transmitting member seated on an enlarged head 60 on the upper end of the tappet 12. The lower portion of the valve stem 115 extends slidably through the annular force transmitting member, and an upwardly facing shoulder 28 near the bottom of the stem serves as a stop which defines the limit of upward motion of the valve relative to the force transmitting member. The shoulder 28 can be provided by a reduced diameter neck portion 26 of the stem that extends a substantial distance above the shoulder and through the force transmitting member. It will be apparent that the spring 13 is effective to apply a strong downward biasing force to the force transmitting member, but that there is a lost motion connection between the valve and the force transmitting member.

When the cam is in positions at which it does not impart lift to the valve and the valve is seated, conventional tappet clearance obtains, that is, there is a gap of a few thousandths of an inch between the bottom of the valve stem and the upper surface of the enlarged head 60 on the tappet. However the shoulder 28 is then spaced the above mentioned small distance from the underside of the force transmitting member 120 so that the valve is free to move to and from its seat through that distance independently of its actuating mechanism comprising the cam, the tappet and the spring 13.

When the cam rotates to a lifting position, as during an intake stroke, the head 60 on the tappet engages the bottom of the valve stem to move the valve to its open position in a conventional manner. As the cam allows the valve to move toward its closed position, the valve substantially follows the cam because the lost motion connection between the valve and the force transmitting member permits only a few thousandths of an inch of relative motion to take place between the valve and its actuating mechanism. However, the lost motion connection between the valve and the force transmitting member becomes effective when the cam moves to the position at which it normally allows the valve to seat, since the position of the valve is then determined substantially entirely by its response to the difference between pressure in its manifold and pressure in the cylinder, and the actuating mechanism is ineffective to position it.

A light spring 124, reacting between the head of the valve and a fixed part of the cylinder body directly therebeneath, urges the valve away from its closed position with a small biasing force. When the engine is being started the spring 124 holds the valve the aforesaid small distance from its seat against the relatively low gas pressure produced by slow upward movement of the piston through its compression stroke, and of course cooperates with suction in the cylinder to hold the valve open during an unfired power stroke. But when the engine is running, pressure inside the cylinder during both compression and power strokes exerts enough force upon the head of valve 9 to overcome the bias of the light spring 124, and hence the valve remains closed during those strokes, in accordance with the conventional valve operation.

The embodiment of the invention illustrated in FIGURE 5 likewise incorporates an entirely conventional cam 10′, not having the feature of Patent No. 2,999,491, and provides for both compression and suction relief during starting without any sacrifice of normal running performance or engine efficiency if used on the exhaust valve.

In this case, however, the reaction force of a spring 213 which maintains the valve 9 in following relationship to the cam 10′ is at all times imposed upon the valve, but said spring is somewhat weaker than a spring 224 which imposes an opposite bias upon the valve when the valve is within the above mentioned small distance from its seat. Hence through that small distance the valve is lightly biased away from its seat with a net force equal to the difference between the forces exerted by the two springs.

Specifically, spring 213 reacts between a downwardly facing spring seat 19 on a fixed part of the cylinder body and a washer-like spring retainer 40 anchored to the valve stem 215 near its lower end, so that the biasing force of the weaker spring is at all times applied to the valve. The stronger spring 224 is received in an upwardly opening well 41 in the tappet 12′ and has its lower end reacting against the bottom of the well and its upper end engaging a plunger-like force transmitting member 320 that is axially slideable in the well. The limit of motion of the force transmitting member 320 away from the spring seat provided by the bottom of the well 41 is defined by an annular stop 43 which is press-fitted into the mouth of the well. A reduced diameter stem portion 44 on the force transmitting member extends freely slideably through the hole in the annular stop member and can project upwardly thereabove to engage the bottom of the valve stem and provide a unidirectional motion transmitting connection between the force transmitting member and the valve.

When the cam 10′ is in those portions of its orbit in which it permits the valve to seat, and there is no substantial pressure in the cylinder, the spring 224, being stronger than spring 213, tends to hold the force transmitting member against the annular stop 43, and the stem portion 44 of the force transmitting member then projects above the top of the tappet by the above mentioned small predetermined distance plus a few thousandths of an inch for tappet clearance. As a result, the valve tends to be held at said small distance from its seat under a net biasing force which is equal to the difference between the forces exerted by the two springs 213 and 224, such net biasing force being sufficiently light so that it can be overcome, and the valve can be seated, by the response of the valve to normal running compression in the cylinder and of course by the force on the valve due to combustion produced pressure. As the cam 10′ moves the valve beyond the aforesaid small distance from its seat, the valve is maintained in following relation to the cam by spring 213, which must be substantially strong.

Under certain circumstances, and partcularly with engines having aluminum cylinders, the embodiment of the invention shown in FIGURE 6 may have advantages over that illustrated in FIGURE 5, since it permits more accurate maintenance of the above mentioned small predetermined distance in the face of unequal thermal expansion of the valve stem and cylinder body. In the FIGURE 6 embodiment, the opposing forces of two springs 313 and 324 of different strengths are again utilized, but in this instance the net biasing force which they impose upon the valve may be employed to bias the valve either toward or away from its closed position, depending upon results desired, as explained hereinafter.

One spring 313, which at all times acts upon the valve to urge it toward its closed position, reacts between a downwardly facing spring seat 119 fixed on the cylinder body and a washer-like spring retainer 140 anchored to the valve stem 115 near the lower end thereof. The other spring 324, which is effective upon the valve only when the valve is within the above mentioned small distance from its closed position, is received in an upwardly opening well 50 in the cylinder body, and the bottom of said well provides a seat 51 for the lower end of that spring. The upper end of spring 324 bears against an annular force transmitting member 320 which fits loosely in the well and freely slideably surrounds the medial portion of the valve stem so as to be movable toward and from the spring seat 51. A stop ring 143 pressed into the mouth of the well provides an abutment against which the force transmitting member 320 is engageable to define the limit of its motion away from the spring seat 51. A reduced diameter lower portion of the valve stem defines a downwardly facing shoulder 52 which cooperates with the force transmitting member to provide a unidirectional motion transmitting connection between the force transmitting member and the valve, the actual abutment surface for the force transmitting member being provided by a C-washer 53 of accurately predetermined thickness which is interposed between the force transmitting member and the shoulder 52.

It will be apparent that the spring 324 is ineffective to exert biasing force on the valve when the force transmitting member is engaged with the annular stop ring 143, and that the C-washer 53 is of such thickness that such engagement occurs whenever the valve is at or beyond the aforesaid small distance from its seat. Increasing the thickness of the washer 53 will increase the length of said small distance. Since the shoulder 52 can be relatively close to the head of the valve, unequal thermal expansion of the valve stem and cylinder body will affect the distance established by the washer 53 to only a negligible extent.

Since the force of the spring 313 is at all times imposed upon the valve in the direction to seat the same, the two springs act in opposition to one another whenever the valve is within said small distance from its seat, imposing upon the valve a small net biasing force in one direction of its motion or the other, depending upon which of the two springs 313 and 324 is the stronger. As shown, the FIGURE 6 arrangement incorporates a cam 10 having the small lobe 17 of the above mentioned Harkness patent, whereby the valve is held slightly off its seat during a substantial portion of the compression stroke and whereby, as pointed out hereinabove, the force of a kickback is substantially relieved. With such a cam, the valve can be subjected, during the power stroke, to a very small net biasing force in the direction to close it, so that it is capable of opening in response to suction in the cylinder during an unfired power stroke but is positively seated through every power stroke in which combustion occurs. To achieve such a net biasing force in the direction of valve closing, the spring 324 is of course made slightly weaker than the spring 313. It would also be feasible, with the arrangement illustrated in FIGURE 6, to make the spring 324 somewhat stronger than the spring 313, so that the net biasing force upon the valve when spring 324 is effective is in the direction to urge the valve away from its seat; and in that event assurance would be had that even small cylinder suctions would be relieved during unfired power strokes, for minimum starting torque, although at the possible sacrifice of a small degree of fuel economy at lower engine speeds. Obviously it would also be possible to have the springs 324 and 313 of such relative strengths as to impose a substantially zero net biasing force upon the valve when spring 324 is effective, so that during every power stroke the position of the valve would at all times be established by the difference between pressure in the cylinder and pressure in the manifold 14.

It will be apparent that an entirely conventional cam, like the cam 10′ of FIGURE 5, could be incorporated in the FIGURE 6 embodiment in place of the cam 10 illustrated therein, but in that event the spring 324 would have to be stronger than the spring 313 in order to have the valve slightly off its seat during compression strokes when the engine is being turned over during starting.

It will be observed that the FIGURE 6 arrangement, with either type of cam, permits conventional tappet clearance to be maintained whenever the valve is fully seated. It will also be noted that removal of the C-washer 53 permits the valve seat to be lapped without interference from the spring 324, which cannot be removed after the valve mechanism is assembled into the engine without removal of the press fitted stop ring 143.

The embodiment of the invention illustrated in FIGURE 7 is generally similar to that of FIGURE 4 but with the lighter spring omitted and with a cam 10 having the feature of Patent No. 2,999,491 utilized to hold the valve 9 spaced a small distance from its closed position during a substantial portion of every compression stroke. In this case, as in the FIGURE 4 version, the annular force transmitting member 120' is at all times maintained in engagement with an enlarged head 60' on the tappet by means of a spring 13 that bears against the force transmitting member, while a lost motion connection between the valve and the force transmitting member renders inoperative the actuating mechanism for the valve whenever the cam is in a position in which it does not impart lift to the valve, to allow the valve to move through the above mentioned small distance to and from its closed position independently of the cam and spring. As in the FIGURE 4 version, the valve stem has an axially elongated reduced diameter neck portion 26 near its bottom which the force transmitting member slideably surrounds and which defines an upwardly facing shoulder 28 that provides the lost motion connection between the valve and the force transmitting member. In this case the head 60' on the tappet is cup-shaped and the annular force transmitting member 120' is flat and rests on the rim of the head 60'.

As shown, the valve in the FIGURE 7 embodiment is biased toward its seat by gravity during the power stroke, so that during an unfired power stroke it is lifted off of its seat solely by suction in the cylinder. If the valve were arranged with its stem normally horizontal, a light spring could be arranged to react between the shoulder 28 on the valve stem and the underside of the force transmitting member. However it would not be feasible to bias the valve away from its seat with a light spring corresponding to the spring 124 in FIGURE 4, because such a spring would tend to hold the valve at the upper limit of its motion relative to its actuating mechanism, and the "lift" upon the valve imparted by such a spring would be added to the lift provided by the small lobe 17 during the compression stroke, with the result that during the compression stroke the valve would be open substantially farther than desired. The relatively large orifice thus provided would create a substantial back pressure through the intake manifold, interfering with normal functioning of the carburetor.

The embodiment of the invention illustrated in FIGURE 8 provides all of the advantages of the invention of the aforesaid Harkness patent, including relief of compression to reduce torque and substantial minimization of the effects of kickback, and at the same time affords automatic reduction of suction in the cylinder during an unfired power stroke in accordance with the present invention, all without entailing any interference with normal functioning of the carburetor. In the FIGURE 8 embodiment the intake valve 109 is arranged in accordance with the principles of the Harkness patent to effect relief of pressure during the compression stroke, while relief of suction during an unfired combustion stroke is provided for by incorporating the principles of the present invention in the exhaust valve 209. The two valves thus cooperate to afford relief of differential pressures across the piston during starting.

The spring 13 for the intake valve 109 is at all times effective to produce a biasing force upon the valve in the direction to close it and maintain it in following relationship with the cam 10, and the cam has the small lobe 17 which holds the valve slightly off its seat during a substantial portion of every compression stroke, the arrangement of the intake valve actuating mechanism being thus in all respects that of the Harkness patent.

The actuating mechanism for the exhaust valve 209 in the FIGURE 8 embodiment has a spring arrangement which is generally similar to that illustrated in FIGURE 4, although the light spring 424 reacts between the upper surface of the force transmitting member and a downwardly facing shoulder 128 on the valve stem, defined by the reduced diameter neck portion 26 near its bottom. However, the light spring 424 must be prevented from lifting the valve 209 off of its seat during the intake stroke (to avoid having exhaust gases sucked back into the cylinder through the slightly unseated exhaust valve) and also during the compression stroke (to avoid an excessively large orifice area for compression relief). To prevent this, the cam 110 which actuates the exhaust valve 209 has a reduced radius on those portions thereof that engage the tappet 112 during the intake and compression strokes, when the exhaust valve should be kept firmly seated, and has its conventional radii in those of its peripheral portions that engage the tappet during the power and exhaust strokes. Stated another way, the cam 110 is cut down, through its intake and compression stroke portions, to a radius which is less than that of its base circle by the value of the above mentioned small distance, and has its base circle radius through its power stroke portion. In this way the valve is seated with tappet clearance when the cut-down portions of the cam 110 are engaged with the tappet; but during the power stroke, when the base circle portion of the cam is engaged with the tappet, the lost motion connection between the valve and the force transmitting member is effective to permit the valve to move through the above mentioned small distance independently of its actuating mechanism.

At this point certain general characteristics of the several illustrated embodiments of the present invention can be summarized. The invention lends itself to incorporation in an engine having the compression relief arrangement disclosed in Patent No. 2,999,491, and in that case the engine has substantial freedom from kickback. With the special cam of that patent spring arrangements like those illustrated in FIGURES 1–3, 6 and 7 must be used, since an arrangement like that illustrated in FIGURE 5 would provide an excessive amount of valve opening during the compression stroke, interfering with carburetion. With the arrangements of FIGURES 4 and 7 the valve must, during the power stroke, be under zero bias or (preferably) be lightly biased towards its seat, to avoid having it open excessively during compression strokes in which the engine is turning slowly. With the arrangement illustrated in FIGURES 1–3 the bias upon the valve when it is within the above mentioned small distance from its seat can be either zero or a light bias towards its seat or a light bias away from its seat.

Using a conventional cam, the principles of this invention can be employed to effect both compression relief and suction relief during starting without affecting the pressure relationships that normally obtain in the cylinder when the engine is running, and FIGURES 4 and 5 depict arrangements by which this result can be obtained. With a conventional cam, however, the arrangement must incorporate two springs, since the valve must be lightly biased away from its seat whenever it is within the above mentioned small distance from its seat, in order to provide for compression relief during starting. Attention is again directed to a comparison of FIGURES 4 and 7, which show basically similar arrangements, one using a conventional cam (FIGURE 4) and the other incorporating the cam of Patent No. 2,999,-491. The FIGURE 5 arrangement does not lend itself to incorporation of the cam of that patent.

FIGURE 9 discloses another expedient made possible by the present invention, whereby only compression relief is provided, but without the special cam lobe of Patent No. 2,999,491. The valve 109 of FIGURE 9 is an intake valve, and its spring arrangement is in all respects identical with that shown in FIGURE 4. The cam 210 is conventional (i.e., has its normal base circle radius and lobe radius) through the intake and compression stroke portions of its periphery, but it cut down below its base circle radius by about .010 in. through its power and exhaust stroke portions. Hence the valve is lightly biased away from its seat to hold it open about .010 in. during compression strokes when the engine is being started, but seats normally during all power and exhaust strokes and opens normally during intake strokes. As compared with the arrangement disclosed in Patent No. 2,999,491, the FIGURE 9 embodiment of this invention has the advantage that normal cylinder pressures are maintained during every compression stroke when the engine is running, since pressures in the cylinder are then high enough to seat the valve against its bias. Thus the FIGURE 9 version may be useful in cases where compression relief is desired for starting without sacrifice of full throttle power, and where suction relief is not considered necessary.

From the foregoing description taken with the accompanying drawings it will be apparent that this invention provides very simple, inexpensive and dependable means for automatically relieving suction during a nonfiring power stroke of a four-stroke cycle engine, without entailing any sacrifice of the full rated power of the engine, and that in certain versions the invention also provides for relief of compression during starting by means of simple apparatus comprising a valve, an entirely conventional cam for the valve, and spring means cooperating with the valve to render its responsive to varying pressures in the cylinder so that the valve automatically functions to prevent any loss of compression during full power running of the engine.

What is claimed as our invention is:

1. A four-stroke cycle internal combustion engine having a piston reciprocable in a cylinder, intake and exhaust poppet valves for respectively controlling the admission of combustible mixture into the cylinder from an intake manifold and the discharge of spent gases from the cylinder to an exhaust manifold, and actuating means for moving each valve between its open and closed positions in timed relation to piston reciprocation and which actuating means limits the instantaneous distance of the valve from its seat, said engine being characterized by:

means at all times operatively associated with one of said valves and the actuating means for the same by which the actuating means is rendered ineffective to affect the position of the valve whenever, during a predetermined portion of the engine cycle, the valve is less than a predetermined small distance from its seat, so that during said portion of the engine cycle the valve can respond to differences between pressure in its manifold and pressure in the cylinder to assume either a slightly open or a fully closed position, whereby the valve is rendered effective to significantly reduce any unbalance of pressure on the piston which retards the same during starting of the engine without substantially interfering with normal pressure relationships which obtain in the cylinder during running of the engine.

2. A four-stroke cycle internal combustion engine having a piston reciprocable in a cylinder, intake and exhaust poppet valves for controlling the flow of gases between the cylinder and intake and exhaust manifolds, respectively, and actuating mechanism for each valve comprising a cyclically moving cam element for moving the valve away from its seat in timed relation to piston reciprocation and a spring element for urging the valve toward its seat and in a direction to maintain following relationship between the valve and the cam element, said engine being characterized by:

means at all times operatively associated with the actuating mechanism for one of the valves, operative when the cam element for said valve is in a predetermined portion of its cycle and the valve is within a predetermined small distance from its seat, by which the spring element for said valve is rendered ineffective to maintain following relationship between the valve and its cam element, so that during said portion of the engine cycle the valve can move through said small distance in response to the difference between pressure in its manifold and pressure in the cylinder and can therefore assume a slightly open position during starting, for significantly reducing any unbalance of pressure on the piston that retards movement of the same, or can close to cause normal pressure relationships to obtain in the cylinder when the engine is running.

3. The internal combustion engine of claim 2, wherein said portion of the engine cycle is the power stroke, further characterized by the fact that:

the cam element for said one valve is arranged to positively hold the valve at a predetermined small distance from its closed position during a substantial portion of the compression stroke of the engine, to thus provide a small orifice through which compression can be relieved when the engine is being started without incurring substantial loss of compression during normal running operation.

4. In an internal combustion engine having a piston reciprocable in a cylinder, intake and exhaust poppet valves for respectively controlling the admission of combustible mixture into the cylinder from an intake manifold and the discharge of spent gases from the cylinder to an exhaust manifold, and a plurality of cams, one for each valve, for actuating each valve from its closed to its open position in timed relation to reciprocation of the piston:

(A) a first spring operatively associated with one of the valves for applying thereto a strong biasing force toward its closed position whenever said valve is more than a predetermined small distance from its closed position, so that the position of said valve whenever it is more than said distance from its closed position is positively established by said cam in cooperation with the first spring;

(B) a second spring for applying to said valve a biasing force which is of a different value than the biasing force applied to the valve by the first spring; and (C) means operatively associated with said one valve and the stronger one of said springs for rendering said stronger spring incapable of applying biasing force to the valve when the valve is at said distance from its closed position, so that whenever the valve is within said distance from its closed position, a biasing force is applied to it which is light enough to render the valve responsive to differences between pressure in its manifold and pressure within the cylinder.

5. A four-stroke cycle internal combustion engine having a piston reciprocable in a cylinder, intake and exhaust poppet valves for respectively controlling the admission of combustion mixture to the cylinder from an intake manifold and the discharge of spent gases from the cylinder to an exhaust manifold, and means for controlling the position of each valve in every part of the engine cycle comprising biasing means for each valve and unidirectional actuating means for each valve movable in timed relation to reciprocation of the piston, said engine being characterized by the fact that the biasing means for one of the valves comprises:

(A) a spring;
(B) means providing a seat against which one end of the spring reacts;

(C) a force transmitting member against which the other end of said spring reacts and which has a unidirectional motion transmitting connection with the valve and is movable in opposite directions relatively toward and from the spring seat; and (D) means for preventing said spring from imposing biasing force upon the valve when the valve is spaced a predetermined small distance from its closed position, so that the valve can be moved back and forth through said small distance by differences between pressure in its manifold and pressure within the cylinder, said last named means comprising means on the engine engageable by the force transmitting member to prevent movement of the same beyond a predetermined distance from the spring seat.

6. In a four-stroke cycle internal combustion engine having a piston reciprocable in a cylinder, intake and exhaust poppet valves for respectively controlling the admission of combustion mixture into the cylinder from an intake manifold and the discharge of spent gases from the cylinder to an exhaust manifold, and cam means for actuating each valve in timed relation to movement of the piston between open and closed positions and through an intermediate position at which the valve is spaced a predetermined small distance from its seat, means for relieving suction in the cylinder during a non-firing power stroke, to reduce starting torque, without incurring release of pressure gas from the cylinder during a power stroke in which combustion occurs, said means comprising:

(A) a pair of springs, one of which is stronger than the other;

(B) means providing a spring seat against which one end of one of said springs reacts;

(C) a force transmitting member against which the other end of said one spring is engaged and which is movable toward and from said spring seat;

(D) means providing a unidirectional motion transmitting connection between the force transmitting member and one of the valves, through which connection said one spring can impose bias in one direction upon said one valve;

(E) means on the engine for limiting motion of the force transmitting member in its direction away from said spring seat, to prevent said one spring from imposing biasing force upon said valve when the valve is at one side of said intermediate position;

(F) means providing a spring seat against which one end of the other spring reacts; and (G) means providing a connection between said valve and the other end of said other spring whereby the biasing force of said other spring is imposed upon the valve when it is at said side of its intermediate position, so that said two springs and their respective connection means cooperate to provide a strong biasing force for urging the valve toward its closed position whenever the valve is near its open position and a biasing force when it is within said small distance from its closed position that is light enough to render the valve responsive to differences between gas pressure in its manifold and gas pressure within the cylinder.

7. The internal combustion engine of claim 6 further characterized by the following:

(A) the first mentioned spring is the stronger and biases the valve toward its closed position; and (B) said means for limiting motion of the force transmitting member comprises a fixed part on the engine against which the force transmitting member engages when said valve is at its said intermediate position so that the valve is relieved of the biasing force of the first mentioned spring whenever the valve is within said predetermined small distance from its seat.

8. The internal combustion engine of claim 7 further characterized by the fact that:

(A) said last named connection means is so arranged that said other spring at all times biases the valve toward its closed position with a light force which supplements that of the first mentioned spring when the valve is beyond said distance from its seat; and (B) the cam means for actuating said one valve is arranged to hold the same out of its closed position by substantially said distance, against the bias of said other spring, during a substantial portion of the compression stroke of the piston.

9. The internal combustion engine of claim 6 wherein the cam means for actuating said one valve comprises a cam and a tappett, further characterized by the following:

(A) said means on the engine for limiting motion of the force transmitting member away from the first mentioned spring seat comprises the tappet, with which the force transmitting member is maintained engaged by the first designated spring; and (B) said other spring is weaker than the first mentioned spring and reacts against a part on the valve in the direction to bias the valve away from its closed position.

10. The internal combustion engine of claim 6, wherein said one valve has an elongated stem and an enlarged coaxial head, further characterized by the following:

(A) the first spring is the stronger and surrounds the valve stem and reacts against an annular spring seat which is fixed on the engine, surrounding the valve stem, and which faces the valve head;

(B) said force transmitting member comprises an annular member which slideably surrounds the valve stem;

(C) said unidirectional motion transmitting connection between the force transmitting member and the valve comprises a circumferential shoulder on the valve stem which faces away from the head and which is engageable by said annular member;

(D) said means for limiting motion of the force transmitting member comprises an annular stop fixed on the engine coaxially with the valve stem and facing away from the valve head to be engageable by said annular member; and (E) said other spring at all times biases the valve toward its closed position so that through said small distance the valve is biased away from its closed position with a force equal to the difference between the biasing forces exerted by the two springs.

11. In an internal combustion engine having a piston reciprocable in a cylinder, valves for controlling the admission of combustible mixture to the cylinder and the discharge of spent gases therefrom, and a plurality of cams, one for each valve, for actuating each valve from its closed position toward its open position in timed relation to reciprocation of the piston:

(A) a first spring operatively associated with one of the valves for applying thereto a strong biasing force toward its closed position whenever said valve is more than a predetermined small distance from its closed position, so that the position of said valve whenever it is more than said distance from its closed position is positively established by said cam in cooperation with the first spring;

(B) a second spring for applying to said valve a biasing force which is of a different value than the biasing force applied to the valve by the first spring; and (C) means operatively associated with said one valve and one of said springs for rendering said one spring incapable of applying biasing force to the valve whenever the valve is at said distance from its closed position, said last named means comprising (1) a member against which one end of said one spring reacts, said member being movable in and opposite to the direction in which said spring exerts its reaction thereon, (2) means for limiting motion of said member in the direction in which said spring exerts its reaction thereon, and (3) means providing a unidirectional driving connection between said member and said one valve through which the reaction force of said spring can be transmitted to said valve.

12. A four-stroke cycle internal combustion engine having a cylinder in which a piston is reciprocable and having intake and exhaust poppet valves for respectively controlling admission of combustible gases to the cylinder from an intake manifold and discharge of spent gases from the cylinder to an exhaust manifold, said engine being characterized by:

(A) means for moving one of the valves toward and from its seat in timed relation to piston reciprocation and for positively establishing the instantaneous position of said one valve whenever it is more than a small predetermined distance from its seat; and (B) means for disabling said first mentioned means whenever said one valve is within said small distance from its seat so that the position of said one valve when it is within said distance from its seat is determined by its response to the difference between pressure in the cylinder and pressure in its manifold.

13. A four-stroke cycle internal combustion engine having a cylinder in which a piston is reciprocable and having intake and exhaust poppet valves for respectively controlling admission of combustible gases to the cylinder from an intake manifold and discharge of spent gases from the cylinder to an exhaust manifold, said engine being characterized by:

means for moving one of the valves toward and from its seat in timed relation to piston reciprocation and for limiting the instantaneous distance of said one valve from its seat to different values in different predetermined portions of the engine's cycle, said means leaving the valve substantially free to move through a predetermined small distance toward and from its seat during a predetermined portion of the engine cycle in response to the difference between pressure in its manifold and pressure in the cylinder.

14. In a four-stroke cycle internal combustion engine having a piston reciprocable in a cylinder, intake and exhaust poppet valves, each having an enlarged head and a stem extending down from the head, for respectively controlling the admission of combustible mixture to the cylinder from an intake manifold and the discharge of spent gases from the cylinder to an exhaust manifold, a cam for actuating each valve away from its seat in timed relation to reciprocation of the piston, and a tappet for each valve providing a motion transmitting connection between the valve and its cam:

(A) means on the engine providing a downwardly facing spring seat adjacent to the stem of one of the valves;

(B) a force transmitting member normally engaged with the tappet for said one valve and providing an upwardly facing spring retainer;

(C) a spring confined under yielding bias between said spring seat and the force transmitting member to maintain the latter engaged with the tappet; and (D) cooperating means on the stem of said one valve and on the force transmitting member providing a lost motion connection between them whereby said valve can move through a predetermined small distance toward and from its seat independently of the force transmitting member, so that when the cam for said valve is in a position in which it permits the valve to engage its seat, said valve can move toward and from its seat in response to differences between pressure in its manifold and pressure in the cylinder and can therefore effect substantial relief of pressure differences across the piston during starting but can maintain normal pressure relationships in the cylinder during running of the engine.

References Cited by the Examiner

UNITED STATES PATENTS 1,361,109  12/1920  Spohrer _____ 123—92
3,066,659  12/1962  Colton _____ 123—90

MARK NEWMAN, *Primary Examiner.*

R. D. BLAKESLEE, *Assistant Examiner.*